(12) United States Patent
Li

(10) Patent No.: US 11,181,226 B2
(45) Date of Patent: Nov. 23, 2021

(54) ADJUSTABLE GROUND SUPPORT BEAM FOR AN LED DISPLAY SCREEN

(71) Applicant: Shenzhen Fabulux Technology Co., LTD, Guangdong (CN)

(72) Inventor: Shuiyuan Li, Guangdong (CN)

(73) Assignee: Shenzhen Fabulux Technology Co., LTD, Shenzhen (CN)

( * ) Notice: Subject to any disclaimer, the term of this patent is extended or adjusted under 35 U.S.C. 154(b) by 201 days.

(21) Appl. No.: 16/676,424

(22) Filed: Nov. 6, 2019

(65) Prior Publication Data
US 2021/0033241 A1    Feb. 4, 2021

(30) Foreign Application Priority Data

Aug. 2, 2019 (CN) .......................... 201910710190.9

(51) Int. Cl.
*F16M 11/00* (2006.01)
*F16M 11/16* (2006.01)
*F16M 13/02* (2006.01)

(52) U.S. Cl.
CPC .......... *F16M 11/16* (2013.01); *F16M 13/022* (2013.01); *F16M 2200/024* (2013.01); *F16M 2200/08* (2013.01)

(58) Field of Classification Search
CPC ...... F16M 11/10; F16M 11/16; F16M 13/022; F16M 2200/024; F16M 2200/08

USPC ................................... 248/157, 188.1, 188.4
See application file for complete search history.

(56) References Cited

U.S. PATENT DOCUMENTS

| | | | |
|---|---|---|---|
| 7,921,612 B2* | 4/2011 | Knight, III ........... | B23Q 1/0054 52/126.6 |
| 8,220,770 B2* | 7/2012 | Justis .................... | A47B 91/024 248/677 |
| 8,876,299 B2* | 11/2014 | Song ....................... | G03B 21/14 353/70 |
| 8,898,999 B1* | 12/2014 | Kugler .............. | E04F 15/02464 52/747.1 |
| 9,200,745 B2* | 12/2015 | Amaral .................. | F16M 11/24 |
| 2016/0084430 A1* | 3/2016 | Kempf ................. | G01D 11/245 73/431 |

* cited by examiner

*Primary Examiner* — Todd M Epps

(57) ABSTRACT

An adjustable ground support beam for an LED display screen has a ground support beam body and two ground support feet, the ground support feet are respectively disposed at two ends under the ground support beam body to support the ground support beam body, each of the ground support feet includes a supporting base and a threaded rod screwed onto the supporting base, the threaded rod is rotatably disposed on the ground support beam body and limited in an upper and lower direction so as to move the supporting base along a lengthwise direction of the threaded rod by rotating the threaded rod to adjust the position of the supporting base. This improves the levelness of the LED display screen, and is convenient for quick installation.

9 Claims, 5 Drawing Sheets

ADJUSTABLE GROUND SUPPORT BEAM FOR AN LED DISPLAY SCREEN

CROSS REFERENCE TO RELATED APPLICATION

This application claims priority of Chinese patent application No. 201910710190.9 filed on Aug. 2, 2019. The contents of the above application are all hereby incorporated by reference.

TECHNICAL FIELD

The application relates to the field of installation of display screens, and in particular, to an adjustable ground support beam for a light emitting diode (LED) display screen.

BACKGROUND TECHNOLOGY

LED display screens are now more and more widely used, especially in various occasions with stage mounting, due to its excellent display effect and applicability. The demand for the creative appearance and rapid assembly of LED display screens is increasing, and installation requirements are becoming higher. When installed on the floor, the ground is not completely horizontal, causing the LED display screens unable to maintain balance, and causing the assembly and connection of the LED display screens to spend too long. Moreover, the conventional footed cup has an integrated structure, thus the adjustment of the footed cup may cause movement for the footed cup. For a ground support beam mounted with a display screen, the friction between the footed cup and the ground is large due to the influence of gravity, making it impossible to make fine adjustment again, so that the LED display screen is unbalanced.

In view of the above, it is necessary to provide an adjustable ground support beam for an LED display screen that can solve the above-mentioned defects and can overcome friction with the ground caused by gravity, thereby allowing fast installation and ease of operation to adjust the balance of the LED display screen and improving efficiency of the LED display screen assembly and connection.

SUMMARY OF THE APPLICATION

A technical problem to be solved by the present application is to provide an adjustable ground support beam for an LED display screen that can overcome friction with the ground caused by gravity, thereby allowing quick installation and ease of operation to adjust the balance of the LED display screen and improving efficiency of the LED display screen assembly and connection.

In order to solve the above technical problem, the present application adopts the following technical solution: an adjustable ground support beam for an LED display screen includes a ground support beam body and two ground support feet. The ground support feet are respectively disposed at two ends under the ground support beam body to support the ground support beam body, each of the ground support feet includes a supporting base and a threaded rod screwed onto the supporting base. The threaded rod is disposed rotatably on the ground support beam body and limited in an upper and lower direction so as to move the supporting base along a lengthwise direction of the threaded rod by rotating the threaded rod.

A further technical proposal is: a recessed housing compartment is formed at the two ends of a bottom surface of the ground support beam body respectively, and the ground support foot is disposed in the housing compartment.

A further technical proposal is: the shape of the supporting base is polygonal.

A further technical proposal is: a top end of the threaded rod is exposed at a top end of the housing compartment, and the ground support beam body is formed with a passage corresponding to the top end of the threaded rod from a top surface thereof.

A further technical proposal is: the center of the top end of the threaded rod is formed with a recessed regular polygonal groove.

A further technical proposal is: a first cavity running through top and bottom is formed at a middle part of the ground support beam body, a hanging rod is disposed in the first cavity, and two ends of the hanging rod are respectively fixed to a front and rear sides of the middle part of the ground support beam body.

A further technical proposal is: a second cavity running through front and back is formed respectively at each end of the ground support beam body, a locking component is disposed in each of the second cavities, the locking component includes an upper locking component, the upper locking component is mounted on the ground support beam body and disposed on a top surface of the second cavity to mount an LED display screen over the ground support beam body, the upper locking component comprises a mounting plate and a positioning rod, the upper plate of the ground support beam body is provided with a connecting through-hole, the mounting plate is fixed below the upper plate of the ground support beam body in accordance with the connecting through-hole, an upper end of the positioning rod is equipped through the mounting plate and a top end thereof is inserted into the connecting through-hole, a lower end of the positioning rod is provided with a knob head to move the positioning rod in the upper and lower direction by twisting the knob head.

A further technical proposal is: at least one handle is arranged on the outer side of the knob head.

A further technical proposal is: the upper locking component further includes a spring, the spring is sleeved on the positioning rod and an upper end surface thereof abuts the mounting plate, and a lower end surface thereof abuts the knob head, the positioning rod is formed with a sliding slot along a lengthwise direction thereof, and a strut disposed in the sliding slot is provided on a side of the mounting plate inwardly in a direction toward the center, a lower end portion of the positioning rod is in thread connection with the knob head.

A further technical proposal is: each of the locking components further includes a lower locking component, and the lower locking component is mounted on the ground support beam body and disposed on a bottom surface of the second cavity, the lower locking component includes a fixing member mounting base provided for a fixing member to connect though so as to mount the LED display screen below the ground support beam body.

The beneficial technical effects of the present application are that the adjustable ground support beam for an LED display screen is provided with a ground support foot at two ends respectively below the ground support beam body, and the ground support foot includes a supporting base and a threaded rod screwed on the supporting base. The threaded rod is disposed rotatably on the ground support beam body and limited in an upper and lower direction, so as to move the supporting base in the upper and lower direction along the threaded rod by rotating the threaded rod to overcome the ground friction caused by gravity, thereby adjusting the position of the supporting base, so that the two ends of the ground support beam body are in the same horizontal plane and fully contact with the ground, which improves the levelness of the LED display screen and adjusts the balance of the LED display screen, and is easy to operate and convenient for quick installation, improving the efficiency of LED display set-up and connection.

DESCRIPTION OF THE EMBODIMENTS

Figure 1:
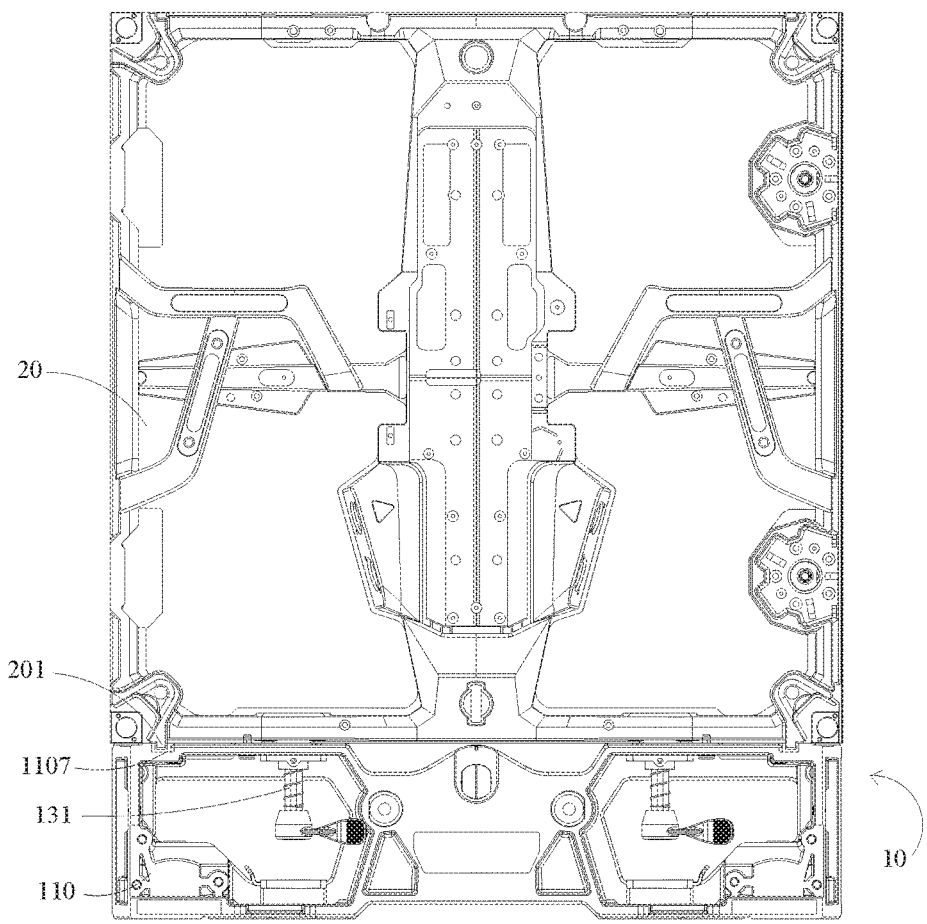
FIG. 1 is a schematic view of the structure of an LED display screen mounted on an adjustable ground support beam for an LED display screen of the present application.

To enable a person skilled in the art to more clearly understand the objectives, technical solutions, and advantages of the present application, the present application will be further described below in conjunction with the accompanying drawings and embodiments.

Referring to FIG. 1 to FIG. 8, in the present embodiment, the adjustable ground support beam for an LED display screen 10 is used for the set-up and connection of an LED display screen 20, and the LED display screen 20 can be mounted above the adjustable ground support beam for an LED display screen 10. The adjustable ground support beam for an LED display screen 10 includes a ground support beam body 110 and two ground support feet 120. The two ground support feet 120 are respectively disposed at two ends below the ground support beam body 110 to support the ground support beam body 110. The ground support foot 120 includes a supporting base 122 and a threaded rod 121 screwed on the supporting base 122. The threaded rod 121 is rotatably disposed on the ground support beam body 110 and limited in an upper and lower direction, this prevents the threaded rod 121 from moving up and down due to the rotation, and enables the threaded rod 121 to rotate about the axial direction and the supporting base 122 to move along the lengthwise direction of the threaded rod 121 by rotating the threaded rod 121, this overcomes the ground friction caused by gravity, thereby adjusting the position of the supporting base 122, and adjusting the height between the ground support beam body 110 and the ground, so that both ends of the ground support beam body 110 are in the same horizontal plane thus in full contact with the ground, therefore this improves the levelness of the LED display screen 20 and adjusts the balance of the LED display screen 20, and is easy to operate and convenient for quick installation, which is beneficial to improving the efficiency of the set-up and connection of LED display screen 20.

In the embodiment shown in the drawings, an upper end portion of the threaded rod 121 extends outwardly to form a flange 1211. The ground support beam body 110 is provided with a lower limit plate 123 at a position corresponding to the threaded rod 121. The threaded rod 121 passes downward through the lower limit plate 123 so that the flange 1211 is supported on the lower limit plate 123, and an upper limit plate 124 is provided above the flange 1211 on the ground support beam body 110. Thereby, the threaded rod 121 is disposed on the ground support beam body 110 such that it is rotatable while limited in the upper and lower direction. Indeed, in other embodiments, other means may be used to achieve the arrangement of the threaded rod 121, such as a bearing, where the ground support beam body 110 is provided with a bearing at a position corresponding to the threaded rod 121, the threaded rod 121 passes downward through the bearing and the upper end portion of the threaded rod 121 is placed in the bearing to achieve that the threaded rod 121 is disposed on the ground support beam body 110 in a manner that is rotatable while limited in the upper and lower direction. Wherein, the threaded rod 121 may adopt an M16 threaded rod.

With reference to FIG. 2, FIG. 3, FIG. 5 and FIG. 7, in particular, in the present embodiment, a recessed housing compartment 111 is formed at the two ends of the bottom surface of the ground support beam body 110 respectively, and the ground support foot 120 is disposed in the housing compartment 111. Preferably, the top end of the threaded rod 121 is exposed at the top end of the housing compartment 111. The ground support beam body 110 is formed with a passage corresponding to the top end of the threaded rod 121 from the top surface thereof, for an adjusting tool to access and to be coupled to the top end of the threaded rod 121. The threaded rod 121 is rotated by rotating the adjusting tool, thereby enabling the supporting base 122 to move along the lengthwise direction of the threaded rod 121. The adjusting tool represents a tool for rotating the threaded rod 121 to adjust the ground support foot 120.

In this embodiment, the supporting base 122 has a polygonal shape, and the supporting base 122 is disposed in the housing compartment 111, so as to effectively prevent the supporting base 122 from rotating along with the rotation of the threaded rod 121 during the process of the movement of the supporting base 122 driven by the rotation of the threaded rod 121, and to overcome the ground friction caused by gravity to achieve fast adjustment. This makes the supporting base 122 move only along the length of the threaded rod 121, so that the movement of the supporting base 122 is stable and reliable, and is convenient for fixing. Specifically, the center of the top end of the threaded rod 121 is formed with a recessed regular polygonal groove 1212. Accordingly, a lower end portion of the adjusting tool is a prism structure that cooperates with the regular polygonal groove 1212. In order to rotate the threaded rod 121 by rotating the adjustment tool, the adjustment tool is inserted into the passage and the lower end portion thereof is inserted into the regular polygonal groove 1212, wherein the regular polygonal groove 1212 includes a regular hexagonal groove, accordingly, the lower end portion of the adjustment tool has a regular hexagonal prism structure.

Figure 5:
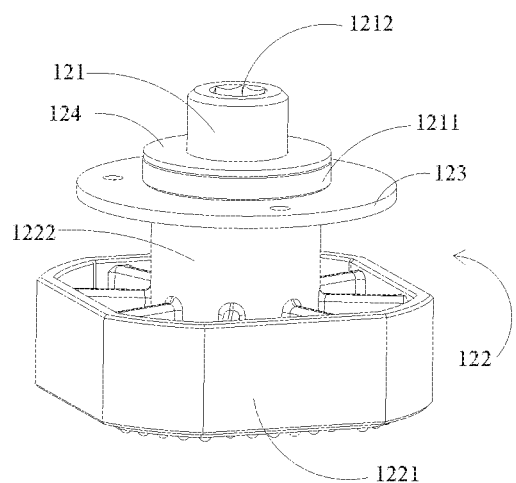
FIG. 5 is a schematic view of the structure of a ground support foot of the adjustable ground support beam for an LED display screen shown in FIG. 2.
Figure 6:
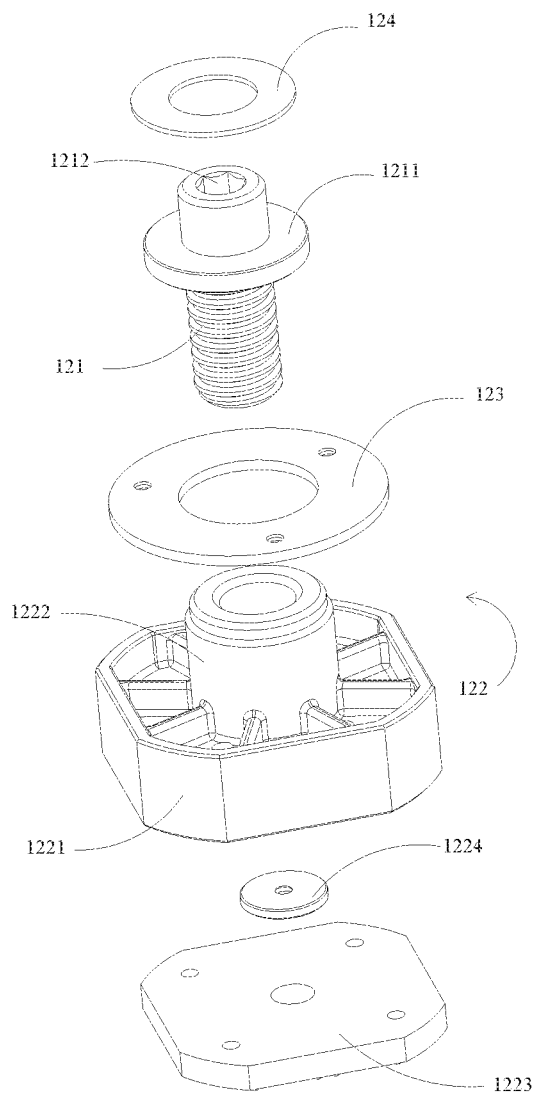
FIG. 6 is an exploded view of the ground support foot of the adjustable ground support beam for an LED display screen shown in FIG. 5.
Figure 7:
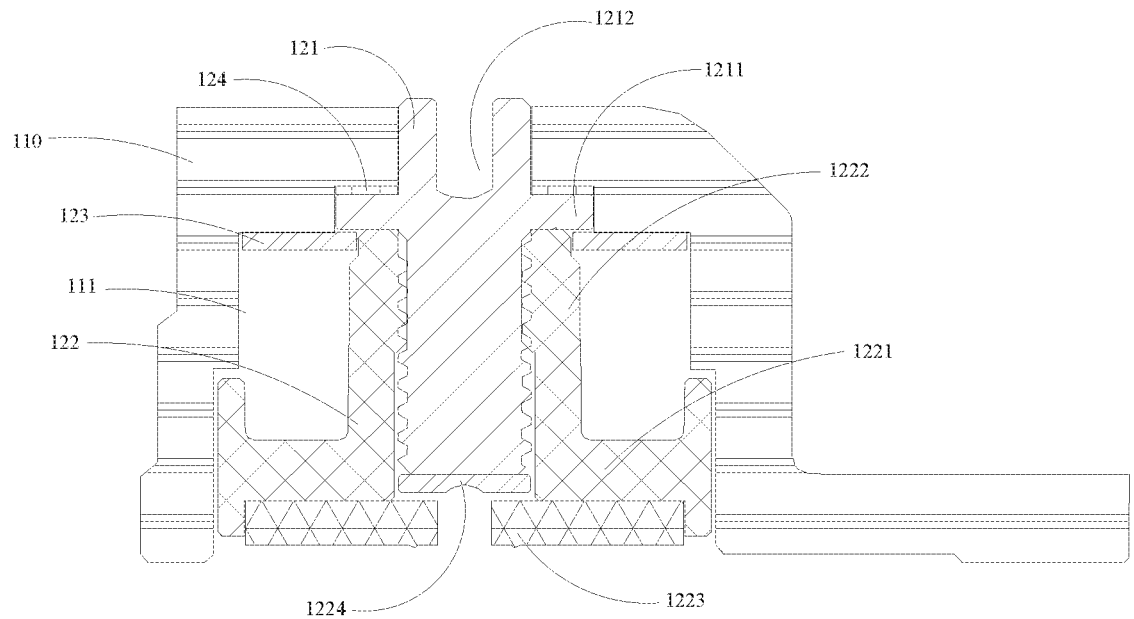
FIG. 7 is a cross-sectional view of a housing compartment of the adjustable ground support beam for an LED display screen shown in FIG. 2.
Figure 8:
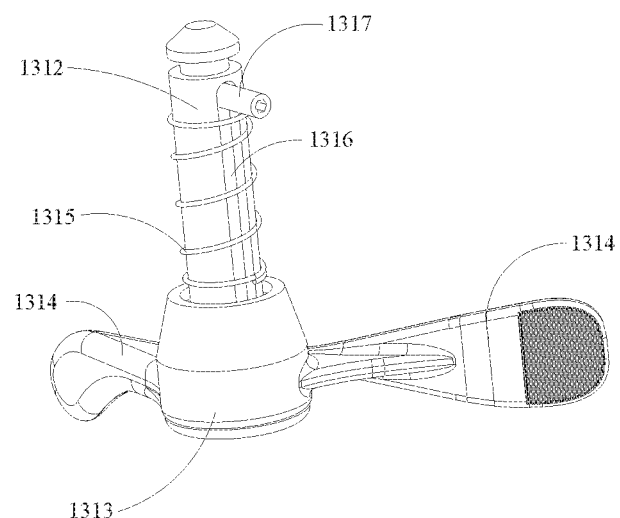
FIG. 8 is a schematic view of the structure of an upper locking component of the adjustable grounding beam for an LED display shown in FIG. 2 omitting the mounting plate.

Continuing to refer to FIG. 5 to FIG. 7, specifically, in the embodiment, the supporting base 122 includes a base 1221, the base 1221 has a polygonal shape, and the center of the base 1221 extends upward to form a sleeve 1222. An inner wall of the sleeve 1222 is formed with an internal thread matching the threaded structure of the external thread of the threaded rod 121, such that when the threaded rod 121 is rotated, the sleeve 1222 of the supporting base 122 can move along the lengthwise direction of the threaded rod 121. Preferably, a lower end surface of the supporting base 122 is provided with a silicone pad 1223. A lower end of the threaded rod 121 is provided with a baffle 1224, and the lower end of the threaded rod 121 is in contact with the silicone pad 1223 through the baffle 1224. The lower end of the base 1221 of the supporting base 122 is recessed inward from the bottom surface thereof to form an accommodating cavity. The silicone pad 1223 is disposed in the accommodating cavity and disposed on the lower end surface of the supporting base 122. By providing the silicone pad 1223, wear can be prevented when the supporting base 122 is in contact with the ground.

With reference to FIG. 2, FIG. 3, FIG. 4, FIG. 8, and FIG. 9, a second cavity 113 running through front and back is formed at each end of the ground support beam body 110. The housing compartment 111 is located in the second cavity 113. A locking component 130 is disposed in each of the second cavities 113. The locking component 130 includes an upper locking component 131 mounted on the ground support beam body 110 and disposed on a top surface of the second cavity 113 for the locking connection with the LED display screen 20 to mount the LED display screen 20 above the ground support beam body 110. The upper locking component 131 includes a mounting plate 1311 and a positioning rod 1312. The second cavity 113 divides the ground support beam body 110 into an upper plate 1104 and a lower plate 1105. The upper plate 1104 of the ground support beam body 110 is provided with a connecting through-hole 1106 corresponding to each of the second cavity 113, for the positioning rod 1312 of the upper locking component 131 to pass through. The mounting plate 1311 is fixed below the upper plate 1104 of the ground support beam body 110 correspondingly to the connecting through-hole 1106. An upper end of the positioning rod 1312 passes through the mounting plate 1311, and the top end thereof is inserted into the connecting through-hole 1106. A knob head 1313 is sleeved onto a lower end of the positioning rod 1312, in order to move the positioning rod 1312 in the upper and lower direction within the connecting through-hole 1106 by rotating the knob head 1313, thus connect and mount the LED display screen 20, which is convenient and simple to operate. Specifically, the upper plate 1104 is further formed with screw holes on both sides of the connecting through-hole 1106, to place connecting screws to connect and fix the LED display screen 20. The housing compartment 111 is located in the second cavity 113, facilitating the user to place the adjustment tool directly into the regular polygonal groove 1212 at the top end of the threaded rod 121 in order to adjust the ground support foot 120 of the adjustable ground support beam for an LED display screen 10 with the LED display screen 20 mounted thereon.

Preferably, two handles 1314 are provided on an outer side of the knob head 1313, and the two handles 1314 are distributed opposite to each other along the outer side of the knob head 1313. By providing the two handles 1314, it is convenient for the user to rotate the knob head 1313 in order to drive the positioning rod 1312 to move up and down, thereby achieving the connection and disassembly of the ground support beam body 110 and the LED display screen 20. Of course, in some embodiments, the number of the handles 1314 may be one, and the remaining structure and function are the same as in this embodiment. In some embodiments, the number of the handles 1314 may be multiple, and the remaining structure and function are the same as in this embodiment.

Specifically, the upper locking component 131 further includes a spring 1315. The spring 1315 is sleeved on the positioning rod 1312, and an upper end surface of the spring 1315 abuts the mounting plate 1311, and a lower end surface thereof abuts the knob head 1313. The positioning rod 1312 is formed with a sliding slot 1316 along its lengthwise direction. A strut 1317 disposed in the sliding slot 1316 is provided on a side of the mounting plate 1311 inwardly in a direction toward the center. The strut 1317 is disposed in the sliding slot 1316 to prevent the positioning rod 1312 from dropping within the mounting plate 1311, and at the same time, to prevent the positioning rod 1312 from rotating during the process of its movement along with the rotation of the knob head 1313. A lower end portion of the positioning rod 1312 is screwed to the knob head 1313, the surface of the lower end portion of the positioning rod 1312 is formed with an external thread, and an inner wall of the knob head 1313 is formed with an internal thread matching the thread structure of the external thread of the positioning rod 1312, so that the positioning rod 1312 can move up and down with the rotation of the knob head 1313, thereby connecting the LED display screen 20. By providing the spring 1315, the knob head 1313 compresses the spring 1315 during the process that the positioning rod 1312 moves upward to connect the LED display screen 20. According to the characteristics of springs, when the LED display screen is disassembled, only a small amount of force is required to rotate the knob head 1313 in an opposite direction, the spring 1315 is then restored to the original length, so that the positioning rod 1312 can rapidly return to the original position.

Figure 2:
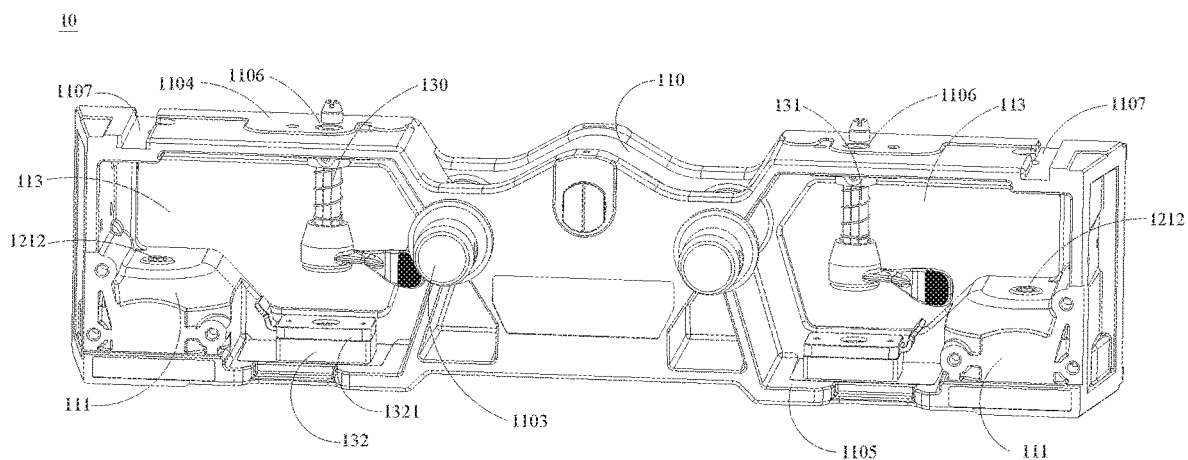
FIG. 2 is a schematic view of the structure of an adjustable ground support beam for an LED display screen of the present application.
Figure 3:
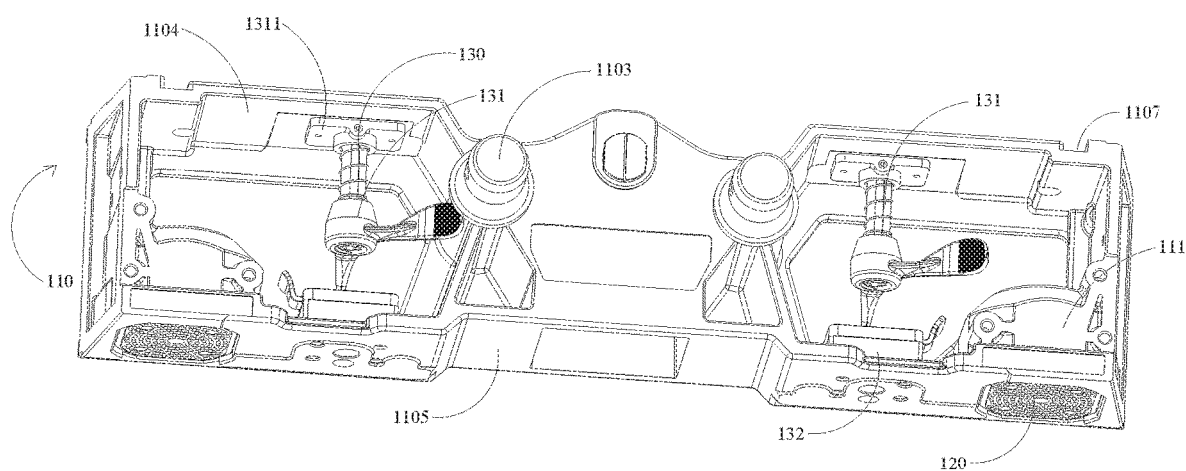
FIG. 3 is a schematic view of the structure of the adjustable ground support beam for an LED display screen shown in FIG. 2 viewed from another angle.
Figure 4:
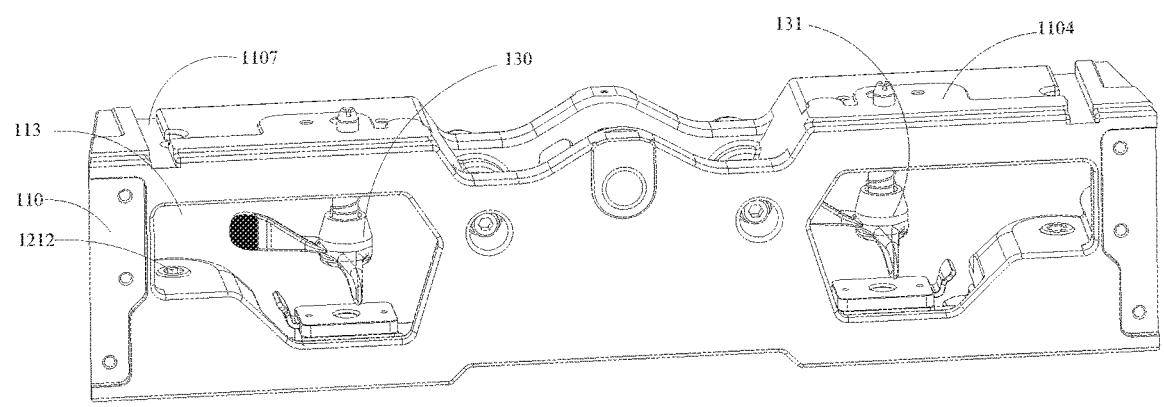
FIG. 4 is a schematic view showing the back structure of the adjustable ground support beam for an LED display screen shown in FIG. 2.

Referring to FIG. 1 to FIG. 3, the two ends of the upper plate 1104 are each formed with an avoiding groove 1107, so that a protrusion 201 at the edge of the LED display screen 20 can be accommodated in the avoiding groove 1107 to protect the LED display screen 20 from damages during assembly. The upper plate 1104 and the lower plate 1105 have an isosceles-trapezoid shape, such that the ground support beam body 110 has a ladder shape.

Figure 9:
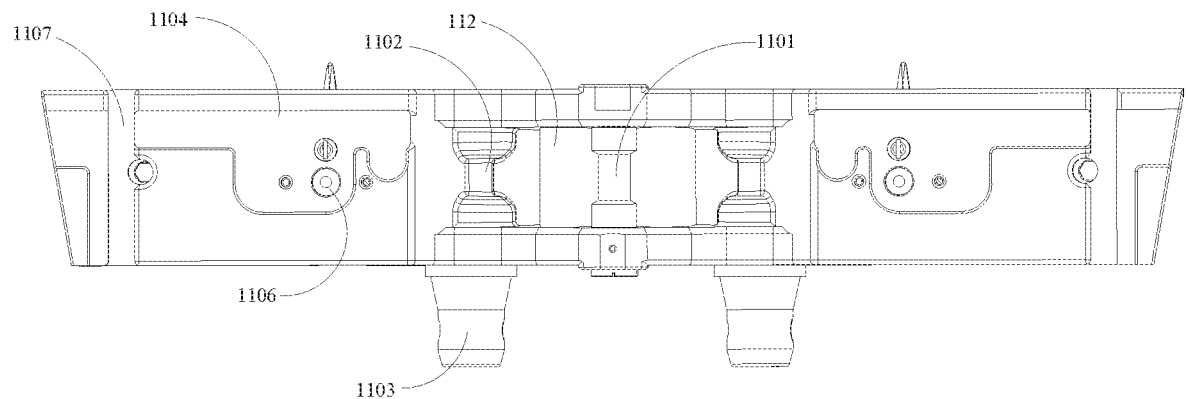
FIG. 9 is a top view of the adjustable ground support beam for an LED display shown in FIG. 2.
Figure 10:
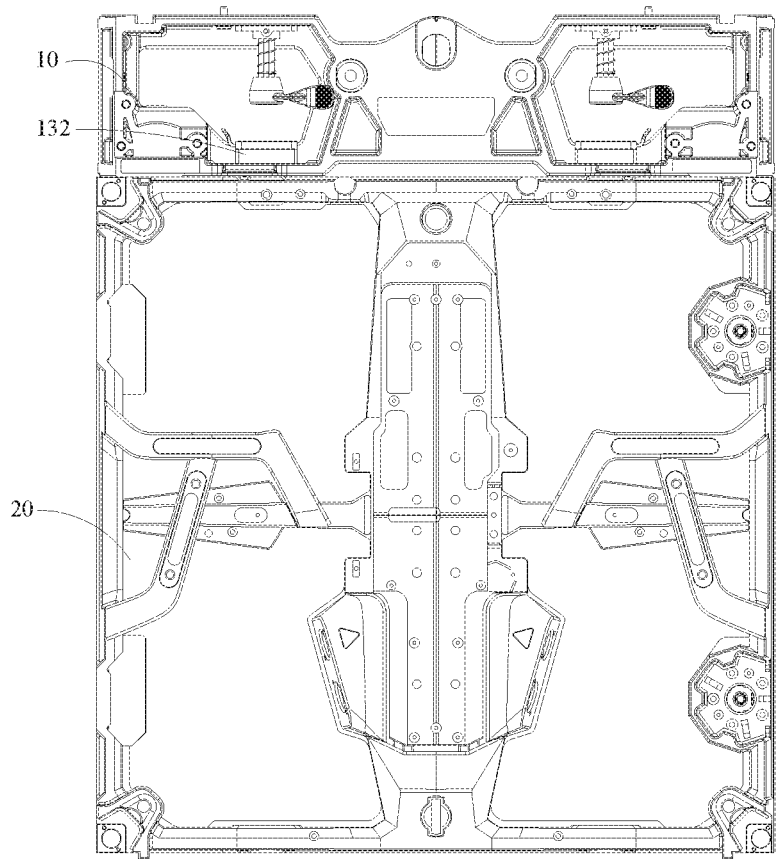
FIG. 10 is a schematic view of the structure of an LED display screen mounted under the adjustable ground support beam for an LED display screen of the present application.

Referring to FIG. 2, FIG. 9 and FIG. 10, FIG. 10 illustrates the structure when the LED display screen 20 is mounted below the adjustable ground support beam for an LED display screen 10. In this embodiment, the LED display screen 20 can be mounted below the adjustable ground support beam for an LED display screen 10. A first cavity 112 running through top and bottom is formed in the middle part of the ground support beam body 110. The first cavity 112 is provided with a hanging rod 1101 therein. Two ends of the hanging rod 1101 are respectively fixed to front and rear sides of the middle part of the ground support beam body 110, for the hanging of the adjustable ground support beam for an LED display screen 10, so as to achieve the hanging of the LED display screen 20, and which makes the adjustable ground support beam for an LED display screen 10 achieve the integration of a hanging beam and a ground support beam, and the LED display screen 20 can be hung and assembled without additional components, and it is convenient for the user to take and store the ground support beam body 110. Preferably, connecting struts 1102 which disposed opposite to each other on the two sides of the hanging rod 1101 are provided in the middle part of the ground support beam body 110 to connect and fix with a back frame in cooperation with connecting rod heads 1103.

Specifically, in the present embodiment, the locking component 130 further includes a lower locking component 132 mounted on the ground support beam body 110 and disposed on a bottom surface of the second cavity 113. The lower locking component 132 is located on the lower plate 1105 of the ground support beam body 110, and includes a fixing member mounting base 1321 for the fixing member to connect through. The fixing member may be a screw for locking the LED display screen 20 in order to mount the LED display screen 20 below the ground support beam body 110.

In summary, the adjustable ground support beam for an LED display screen of the present application is provided with a ground support foot at two ends respectively below the ground support beam body, and the ground support foot includes a supporting base and a threaded rod screwed on the supporting base. The threaded rod is disposed rotatably on the ground support beam body and limited in an upper and lower direction, so as to move the supporting base in the upper and lower direction along the threaded rod by rotating the threaded rod to overcome the ground friction caused by gravity, thereby adjusting the position of the supporting base, so that the two ends of the ground support beam body are in the same horizontal plane and fully contact with the ground, which improves the levelness of the LED display screen and adjusts the balance of the LED display screen, and is easy to operate and convenient for quick installation, also improves the efficiency of the set-up and connection of LED display screens. At the same time, a recessed housing compartment is formed at the two ends of a bottom surface of the ground support beam body respectively, and the ground support foot is disposed in the housing compartment. The supporting base has a polygonal shape, so that effectively prevents the supporting base from rotating along with the rotation of the threaded rod during the process of the movement of the supporting base driven by the rotation of the threaded rod. This makes the supporting base move only along the length of the threaded rod, thereby the movement of the supporting base is stable and reliable, and is convenient for fixing.

The above description is only a preferred embodiment of the application, and is not intended to limit the application in any way. A person skilled in the art can make various equivalent changes and modifications on the basis of the above embodiments, and all equivalent changes or modifications made within the scope of the claims should fall within the protection scope of the present application.

What is claimed is:

1. An adjustable ground support beam for an LED display screen, wherein the adjustable ground support beam comprises:
   a ground support beam body;
   two ground support feet respectively disposed at two ends below the ground support beam body to support the ground support beam body, the ground support foot including a supporting base and a threaded rod screwed on the supporting base, the threaded rod being rotatably disposed on the ground support beam body and limited in upper and lower directions such that the supporting base moves along a lengthwise direction of the threaded rod by rotating the threaded rod;
   wherein a recessed housing compartment is formed at both ends of a bottom surface of the ground support beam body respectively, the ground support foot is disposed in the housing compartment.

2. The adjustable ground support beam for an LED display screen of claim 1, wherein the supporting base has a polygonal shape.

3. The adjustable ground support beam for an LED display screen of claim 1, wherein a top end of the threaded rod is exposed at a top end of the housing compartment, the ground support beam body is formed with a passage corresponding to the top end of the threaded rod from a top surface thereof.

4. The adjustable ground support beam for an LED display screen of claim 3, wherein a center of the top end of the threaded rod is formed with a recessed regular polygonal groove.

5. An adjustable ground support beam for an LED display screen, wherein the adjustable ground support beam comprises: a ground support beam body; two ground support feet respectively disposed at two ends below the ground support beam body to support the ground support beam body, the ground support foot including a supporting base and a threaded rod screwed on the supporting base, the threaded rod being rotatably disposed on the ground support beam body and limited in upper and lower directions such that the supporting base moves along a lengthwise direction of the threaded rod by rotating the threaded rod, wherein a middle part of the ground support beam body is formed with a first cavity running through top and bottom, a hanging rod is disposed in the first cavity, two ends of the hanging rod are respectively fixed to front and rear sides of the middle part of the ground support beam body.

6. An adjustable ground support beam for an LED display screen, wherein the adjustable ground support beam comprises: a ground support beam body; two ground support feet respectively disposed at two ends below the ground support beam body to support the ground support beam body, the ground support foot including a supporting base and a threaded rod screwed on the supporting base, the threaded rod being rotatably disposed on the ground support beam body and limited in upper and lower directions such that the supporting base moves along a lengthwise direction of the threaded rod by rotating the threaded rod, wherein each of the two ends of the ground support beam body is formed with a second cavity running through front and back, the second cavities each forms a locking component therein, the locking component includes an upper locking component mounted on the ground support beam body and disposed on a top surface of the second cavity to mount an LED display screen above the ground support beam body, the upper locking component includes a mounting plate and a positioning rod, an upper plate of the ground support beam body is provided with a connecting through-hole, and the mounting plate is fixed under the upper plate of the ground support beam body corresponding to the connecting through-hole, an upper end of the positioning rod is inserted into the mounting plate and a top end thereof is inserted into the connecting through-hole, a knob head is sleeved on a lower end of the positioning rod to move the positioning rod up and down by rotating the knob head.

7. The adjustable ground support beam for an LED display screen of claim 6, wherein an outer side of the knob head is provided with at least one handle.

8. The adjustable grounding beam for an LED display screen of claim 6, wherein the upper locking component further includes a spring, the spring is sleeved on the positioning rod and an upper end surface thereof abuts the mounting plate, and a lower end surface thereof abuts the knob head, the positioning rod is formed with a sliding slot along a lengthwise direction thereof, and a side of the mounting plate is provided with a strut disposed in the sliding slot and installed inwardly in a direction toward a center, and a lower end portion of the positioning rod is in threaded connection with the knob head.

9. The adjustable ground support beam for an LED display screen of claim 6, wherein each of the locking components further includes a lower locking component, the lower locking component is mounted to the ground support beam body and is provided on a bottom surface of the second cavity, the lower locking component includes a fixing member mounting base for a fixing member to connect through, so as to mount the LED display screen under the ground support beam body.

* * * * *